(12) United States Patent
Cherchi

(10) Patent No.: US 12,313,919 B2
(45) Date of Patent: May 27, 2025

(54) ELECTRO-OPTIC PLASMONIC DEVICES

(71) Applicant: Teknologian tutkimuskeskus VTT Oy, Espoo (FI)

(72) Inventor: Matteo Cherchi, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 406 days.

(21) Appl. No.: 17/777,627

(22) PCT Filed: Nov. 18, 2020

(86) PCT No.: PCT/FI2020/050773
§ 371 (c)(1),
(2) Date: May 18, 2022

(87) PCT Pub. No.: WO2021/099686
PCT Pub. Date: May 27, 2021

(65) Prior Publication Data
US 2023/0022900 A1 Jan. 26, 2023

(30) Foreign Application Priority Data
Nov. 18, 2019 (FI) ...................................... 20195986

(51) Int. Cl.
*G02F 1/355* (2006.01)
*G02B 6/122* (2006.01)
*G02F 1/035* (2006.01)

(52) U.S. Cl.
CPC ........... *G02F 1/035* (2013.01); *G02B 6/1226* (2013.01); *G02F 1/355* (2013.01); *G02F 2203/10* (2013.01)

(58) Field of Classification Search
CPC ...... G02F 1/035; G02F 1/355; G02F 2203/10; G02B 6/1226
See application file for complete search history.

(56) References Cited

U.S. PATENT DOCUMENTS

| | | |
|---|---|---|
| 2010/0039693 A1 | 2/2010 | Kobyakov et al. |
| 2016/0357035 A1 | 12/2016 | Kamei et al. |
| 2017/0146887 A1 | 5/2017 | Timurdogan et al. |

FOREIGN PATENT DOCUMENTS

| | | |
|---|---|---|
| EP | 2861780 A1 | 6/2015 |
| EP | 3304193 B1 | 8/2019 |
| JP | 2011145495 A | 7/2011 |
| WO | WO2011162719 A1 | 12/2011 |
| WO | WO2017121608 A1 | 7/2017 |
| WO | WO2019183066 A1 | 9/2019 |

OTHER PUBLICATIONS

"Silicon—Organic and Plasmonic-Organic Hybrid Photonics" by Heni et al., ACS Photonics, vol. 4, pp. 1576-1590 (Year: 2017).*

(Continued)

*Primary Examiner* — Robert Tavlykaev
(74) *Attorney, Agent, or Firm* — Laine IP Oy

(57) ABSTRACT

According to an example aspect of the present invention, there is provided an electro-optic plasmonic device comprising: a slot waveguide that is defined by a first metallic electrode, a second metallic electrode and dielectric material in a slot between the first and second metallic electrodes. The device is configured to utilize the electric field induced Pockels effect.

18 Claims, 5 Drawing Sheets

(56) References Cited

OTHER PUBLICATIONS

"Quadratic electro-optic effect in silicon-organic hybrid slot-waveguides" by Steglich et al., Optics Letters, vol. 43, No. 15, pp. 3598-3601 (Year: 2018).*

"Enhanced electro-optic effect in amorphous hydrogenated silicon based waveguides" by Zelikson et al, Appl. Phys. Lett., vol. 61, No. 14, pp. 1664-1666 (Year: 1992).*

"On-Chip Dispersion Measurement of the Quadratic Electro-Optic Effect in Nonlinear Optical Polymers Using a Photonic Integrated Circuit Technology" by Steglich et al, IEEE Photonics Journal, vol. 11, No. 3, paper 4900510 (Year: 2019).*

"Quadratic electro-optical silicon-organic hybrid RF modulator in a photonic integrated circuit technology" by Steglich et al, IEEE International Electron Devices Meeting (IEDM), ISBN 978-1-7281-1987-8 (Year: 2018).*

Boyd et al: The third-order nonlinear optical susceptibility of gold. Optics Communications, 2014, vol. 326, pp. 74-79.

Burla et al: 500 GHz plasmonic Mach-Zehnder modulator enabling sub-THz microwave photonics. APL Photonics, American Institute of Physics, 2 Huntington Quadrangle, May 30, 2019, vol. 4, No. 5.

Grillet et al: Amorphous silicon nanowires combining high nonlinearity, FOM and optical stability. Optics Express, Sep. 24, 2021, vol. 20, No. 20, pp. 22609-22615.

He et al: Measurement of electric-field induced second harmonic generation in hydrogenated amorphous silicon. Applied Physics Letters, 2012, vol. 101, pp. 161604-161605.

Kikuchi et al: Theory of electric field-induced optical second harmonic generation in semiconductors. Optical and Quantum Electronics, 1980, vol. 12, pp. 199-205.

Kuyken et al: Nonlinear optical interactions in silicon waveguides. Nanophotonics, 2017, vol. 6, pp. 377-392.

Lin et al: Engineering of a Second-Order Nonlinearity in Silicon-Dielectric Multilayers. Proceedings of the Conference on Lasers and Electro-Optics (CLEO), 2016.

Naryanan et al: Optical nonlinearities in hydrogenatedamorphous silicon waveguides. Optics Express, 2010, vol. 18, pp. 8998-9005.

Pelec et al: Picosecond all-optical switching in hydrogenated amorphous silicon microring resonators. Optics Express, Apr. 2014.

Phelan et al: Subnanosecond electrical modulation of light with hydrogenated amorphous silicon. Applied Physics Letters, 1981, vol. 38, pp. 596-598.

Pockels Effect, Wikipedia, Retrieved Oct. 14, 2019.

Rao et al: A 2.5 ns switching time MachZender modulator in as deposited a—Si:H. Optics Express, Sep. 2012.

Reed et al: Silicon optical modulators. Nature Photonics, Apr. 2010.

Sederberg et al: Integrated nanoplasmonic waveguides for magnetic, nonlinear, and strong-field devices. Nanophotonics, 2017, vol. 6, pp. 235-257.

Timurdogan et al: Electric field-induced second-order nonlinear optical effects in silicon waveguides. Nature Photonics, Feb. 2017.

Zhang et al: Electrically controlled second-harmonic generation in silicon-compatible plasmonic slot waveguides: a new modulation scheme. Optics Letters, 2014, vol. 39, pp. 4001-4004.

Zhang et al: Enhancement of nonlinear effects using silicon plasmonic structures. Doctoral Thesis, Université Paris-Saclay, Dec. 2015.

* cited by examiner

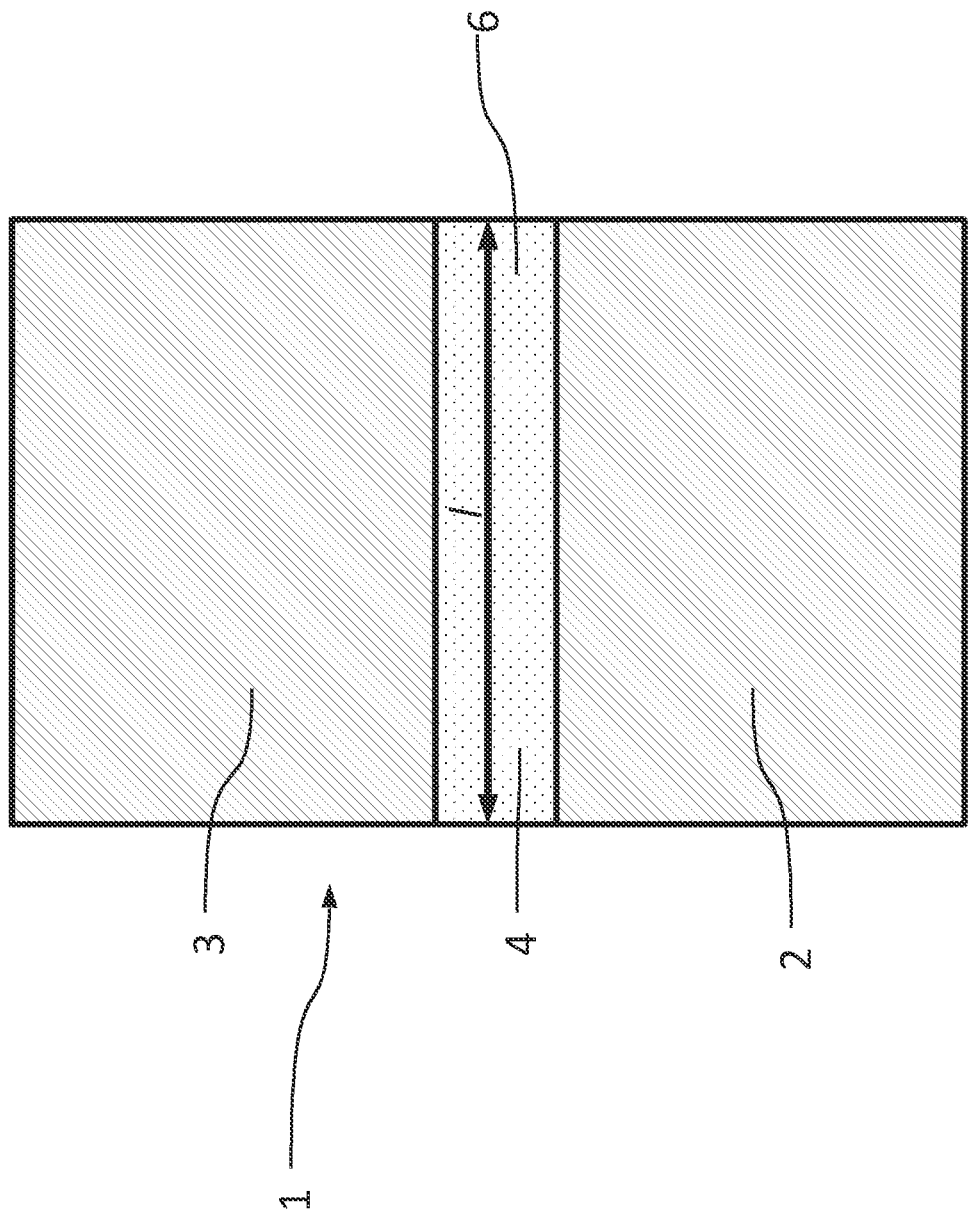

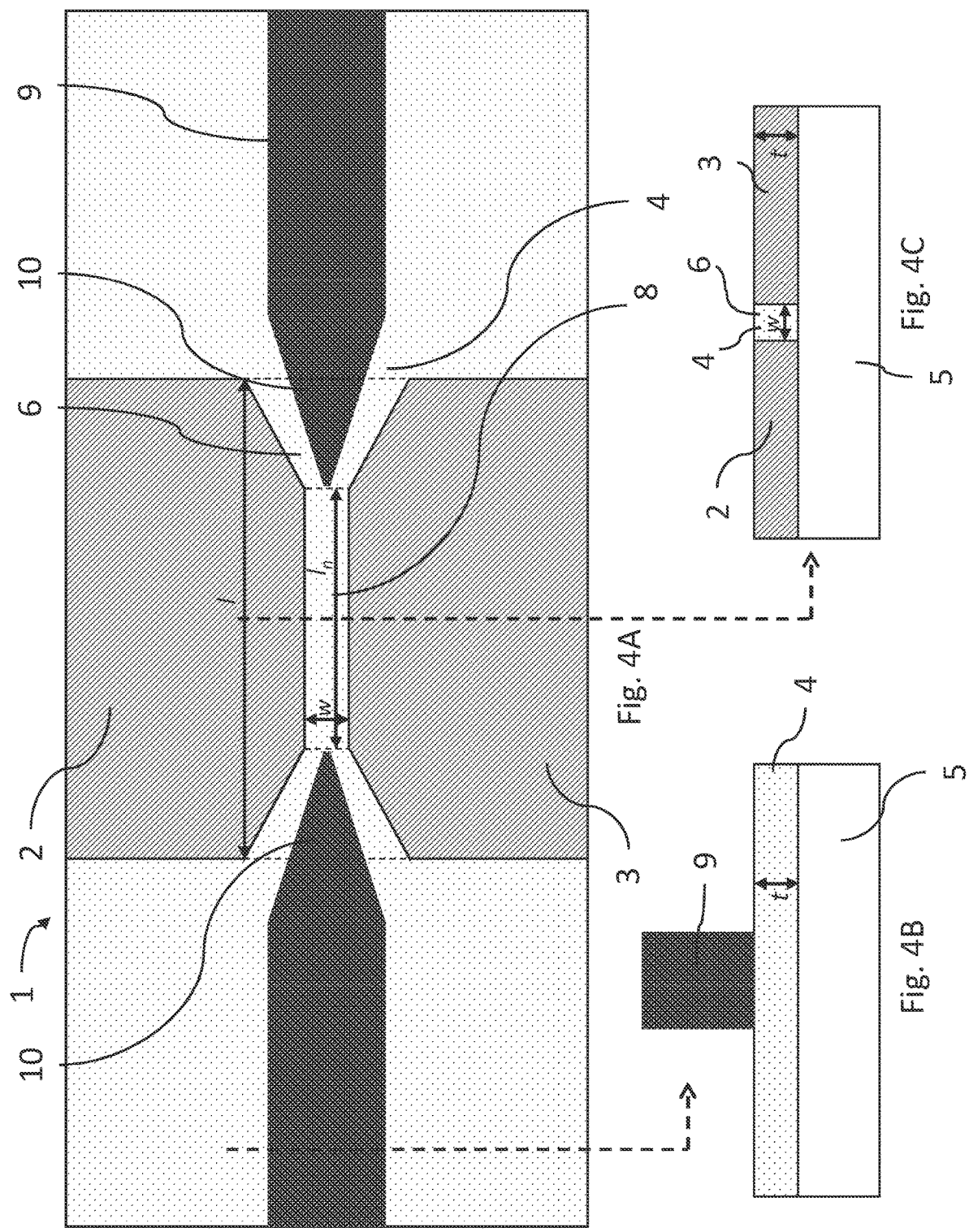

ELECTRO-OPTIC PLASMONIC DEVICES

FIELD

The present invention relates to electro-optic devices. In particular, the present invention relates to electro-optic devices capable of being used in microwave photonics and in telecom and datacom applications.

BACKGROUND

Reed, R. T. et al. article "*Silicon optical modulators*", Nature Photonics, volume 4, pages 518-526 (2010) discloses different types of plasma dispersion based silicon optical modulators. These types of modulators typically have the drawback of limited speed (50 GHz), high inherent losses due to the carriers, large footprint (for MZI configuration) and high driving voltages (MZI). Using ring resonators can solve the last two drawbacks, at the cost of operating at single wavelength and requiring power-hungry thermo-optical tuning to match the target wavelength.

Narayanan, Karthik et al., "*Optical nonlinearities in hydrogenated-amorphous silicon waveguides*", Optics Express, Vol. 18, No. 9 (2010), has measured the optical nonlinearities in hydrogenated-amorphous silicon (a-Si:H) waveguides through the transmission of ultra-short pulses. The measured nonlinear coefficient was at least 5 times the value in crystalline silicon.

A further type of devices are a-Si:H plasma dispersion modulators demonstrated by Rao, Sandro et al. in article "A 2.5 ns switching time MachZender modulator in as deposited a-Si:H", Optics Express, Vol. 20, No. 9 (2012), and by Pelc, Jason S. et al. in article "Picosecond all-optical switching in hydrogenated amorphous silicon microring resonators", Optics Express 22(4):3797-810 (2014). The speed of these devices is limited by carrier mobility compared to crystalline Si.

An alternative modulation approach based on Pockels effect in standard silicon waveguides has been demonstrated recently by Timurdogan, E., et al in the article "*Electric field-induced second-order nonlinear optical effects in silicon waveguides*", Nature Photonics, Volume 11, Issue 3, pp. 200-206 (2017). The symmetry of crystalline silicon inhibits a second-order optical nonlinear susceptibility, $\chi^{(2)}$, in complementary metal-oxide-semiconductor-compatible silicon photonic platforms. However, $\chi^{(2)}$ is required for important processes such as phase-only modulation, second-harmonic generation (SHG) and sum/difference frequency generation. According to the publication, the crystalline symmetry is broken by applying direct-current fields across p-i-n junctions in silicon ridge waveguides, inducing a $\chi^{(2)}$ proportional to the large $\chi^{(3)}$ of silicon and to the strength of the applied electric field. This technology shows low-loss, relatively low speed, and still large footprint. Inducing high Pockels effect ($\chi^{(2)}$) requires high voltages (>10 V), and plasma dispersion still plays a significant role.

Most recently, ultra-fast plasmonic devices based on Pockels effect in nonlinear polymers have been demonstrated by Maurizio Burla, et al. in the article "500 *GHz plasmonic Mach-Zehnder modulator enabling sub-THz microwave photonics*", APL Photonics 4, 056106 (2019). The plasmonic modulator demonstrated in this article consists of a metal-insulator-metal slot waveguide wherein the slot is filled with a nonlinear organic material. Polymers are well known for their poor reliability in optical devices. Furthermore, polymers with high $\chi^{(2)}$ need to be electrically poled, and poling is destroyed if the sample is taken to high temperatures (typically >200° C.), e.g. during the following fabrication steps, or just during soldering of wires on the driving contacts.

Zhang, J. et al. article "*Electrically controlled second-harmonic generation in silicon-compatible plasmonic slot waveguides: a new modulation scheme*", Optics Letters, Vol. 39, pp. 4001-4004 (2014) discloses modulation based on second-harmonic generation in a plasmonic slot waveguide. The slot waveguide has a metal-dielectric-metal structure wherein the slot is filled with a nonlinear polymer material. The proposed modulation approach is not suitable for standard telecom applications, requiring phase or amplitude modulation of an input light signal without any wavelength conversion.

There remains a need for new types of electro-optic devices, which overcome at least some of the above discussed disadvantages and restrictions of the prior technologies.

SUMMARY OF THE INVENTION

It is an aim of the invention to provide new ultra-fast electro-optic devices.

The invention is defined by the features of the independent claims. Some specific embodiments are defined in the dependent claims.

According to a first aspect of the present invention, there is provided an electro-optic plasmonic device comprising: a waveguide that is defined by a first metallic electrode, a second metallic electrode and dielectric material in a slot between the first and second metallic electrodes. The device is configured to electrically control the phase of a propagating light signal through electric-field induced Pockels effect.

According to a second aspect of the present invention, there is provided a method of manufacturing an electro-optic plasmonic device comprising: providing dielectric material, a first metallic electrode and a second metallic electrode on a substrate such that the first and second electrodes define a waveguide in a slot between the first and second metallic electrodes, wherein the dielectric material is in the slot, and wherein the dielectric material exhibits electric-field-induced Pockels effect.

The present invention makes it possible to use also a selection of centrosymmetric dielectric materials in electro-optic plasmonic devices contrary to what has been believed in the art. For example, at the time of writing the present application, Wikipedia article about the Pockels effect states: "The Pockels effect occurs only in crystals that lack inversion symmetry, such as lithium niobate, and in other non-centrosymmetric media such as electric field poled polymers or glasses." Lithium niobate has a benefit of having a relatively high second-order nonlinear susceptibility $\chi^{(2)}$ (~70 pm/V), but it would be good to have also better materials (>100 pm/V) from which to choose. Preferably, these new materials would have better compatibility with the common manufacturing processes in device electronics. With the present invention, it is possible to utilize also such centrosymmetric dielectric materials that exhibit relatively high third-order nonlinear susceptibility $\chi^{(3)}$, which can then be used to induce effective second-order nonlinear susceptibility $\chi_{eff}^{(2)}$ in the material by means of an electric field applied in accordance with the invention. This provides significant benefits over the prior art.

It has been found that it is possible to make a device that has several advantages compared to the previous devices utilizing Pockels effect in waveguides. For example, it is possible to use amorphous silicon (a-Si) as the dielectric. In addition to the compatibility with the standard manufacturing processes used in the device electronics, a-Si provides good electro-optical properties when an electric field is applied across the material. As a matter of fact, Timurdogan, E., et al, ("*Electric field-induced second-order nonlinear optical effects in silicon waveguides*", Nature Photonics, Volume 11, Issue 3, pp. 200-206 (2017)) have electrically induced relatively high Pockels effect in crystalline silicon, up to 41 pm/V. Hydrogenated amorphous silicon can significantly exceed that value, given that it can reach third-order nonlinear susceptibility $\chi^{(3)}$ up to five times that of crystalline silicon, as reported in the above-cited article by Narayanan, Karthik et al., "*Optical nonlinearities in hydrogenated-amorphous silicon waveguides*", Optics Express, Vol. 18, No. 9 (2010).

When compared to demonstrated record fast plasmonic modulators a device of the present kind using a-Si has following advantages: Comparable effective $\chi^{(2)}$ (~200 pm/V), a-Si:H is a standard CMOS material deposition, a-Si:H stands higher temperatures compared to any polymer (even though it poses some temperature constraints compared to normal Si) and transition losses from the dielectric to the plasmonic waveguide can be lower.

The use of a-Si in the present configuration provides benefits also over devices using silicon (Si) dielectric. For example, a-Si has 5× higher $\chi^{(3)}$ nonlinearity than standard Si, the small transverse size of plasmon modes allows low (CMOS compatible) driving voltages, carrier mobility of a-Si:H is much lower than in Si, so that plasma dispersion contribution will be dampened out at relatively low frequencies (>1 GHz), a-Si:H can be grown anywhere on a wafer with high control of the layer thickness, footprint is reduced by some orders of magnitude (~10 μm vs several mm), and intrinsic losses can be low.

Mobility of carriers in a-Si is slower than in normal silicon, meaning that plasma dispersion modulation does not play a role at very high frequencies, where the contribution of plasma dispersion will be damped out. This is beneficial, especially for microwave photonics application, where the linearity of the modulator is important. Plasma dispersion modulation is nonlinear, whereas Pockels effect ensures linear response. Therefore, one benefit of the embodiments using a-Si is, thanks to both the higher operation speed and the lower mobility of carriers in a-Si, that the response is highly linear.

Some benefits of the invention were illustrated above using a-Si as an example of the dielectric material, but of course also other materials than a-Si can be used according to the present invention as far as an effective Pockels effect can be induced in the material by means of an electric field applied across it. Best materials will have high $\chi^{(3)}$ nonlinearity or high breakdown field, and preferably a combination of these two.

BRIEF DESCRIPTION OF THE DRAWINGS

FIG. 1B illustrates a top view of an electro-optic device in accordance with at least some embodiments of the present invention.

FIG. 4A illustrates a top view of an electro-optic device in accordance with at least some embodiments of the present invention.

FIGS. 4B and 4C illustrate a side view of two different cross-sections of the electro-optic device of FIG. 4A.

EMBODIMENTS

As appears from above, it has been found that, in a waveguide with a metal-dielectric-metal structure, it is possible to utilize also such centrosymmetric dielectric materials that exhibit relatively high third-order nonlinear susceptibility $\chi^{(3)}$, which can then be used to induce an effective Pockels effect in the material by means of an electric field, applied in accordance with the invention. For example, amorphous silicon (a-Si) as the dielectric provides good electro-optical properties when electric field is applied across the material.

Figure 1A:
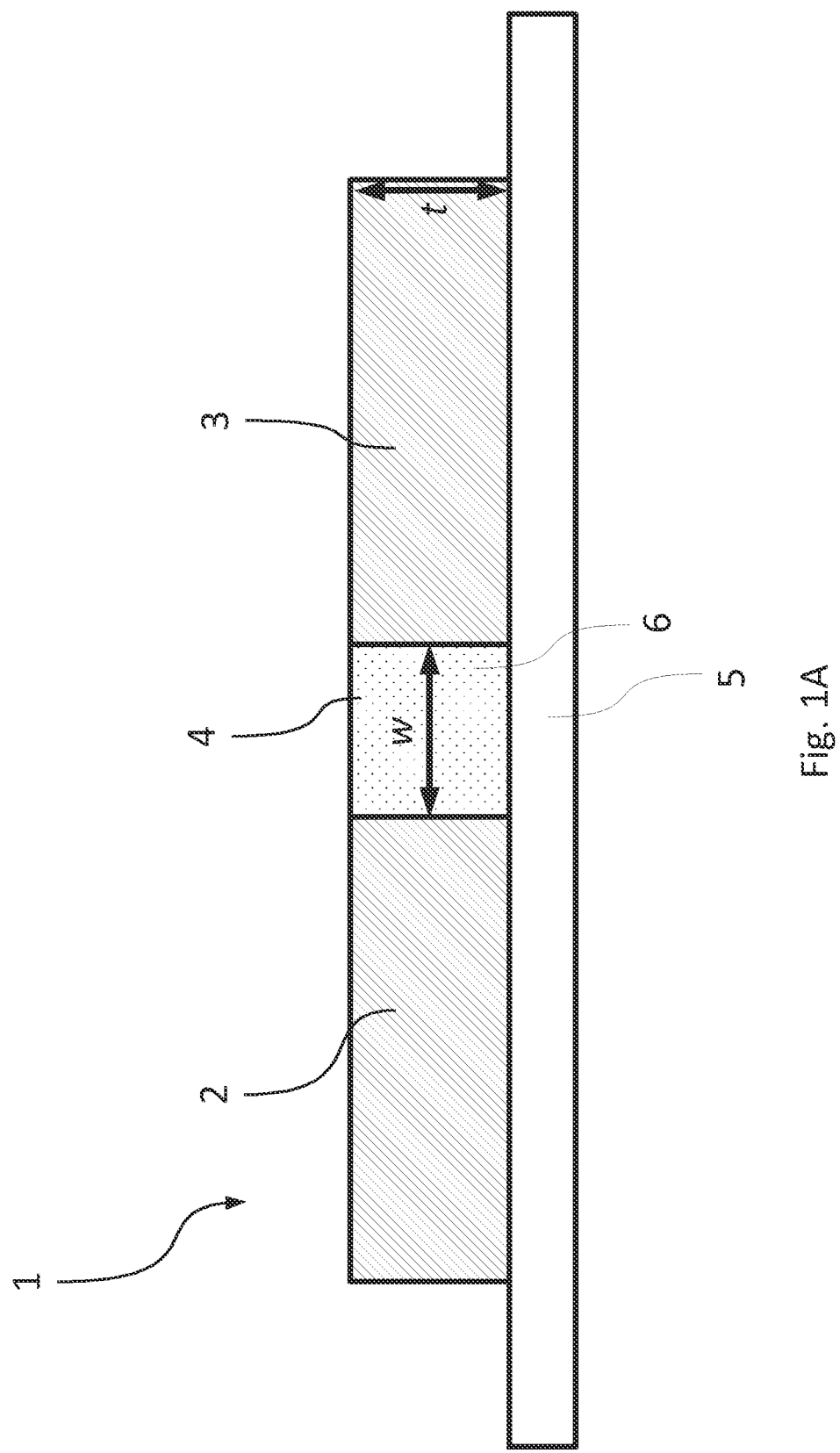
FIG. 1A illustrates a side view of an electro-optic device in accordance with at least some embodiments of the present invention.

FIG. 1A illustrates a side view of an electro-optic plasmonic device 1 in accordance with at least some embodiments of the present invention.

FIG. 1B illustrates a top view of an electro-optic plasmonic device 1 in accordance with at least some embodiments of the present invention.

According to the FIGS. 1A and 1B the electro-optic plasmonic device comprises a slot waveguide 6. The slot waveguide 6 is defined by two metallic electrodes 2, 3 that are spaced apart from each other. The slot waveguide 6 is formed on a substrate 5. The space between the metallic electrodes 2, 3 is called a slot. Between the metallic electrodes 2, 3 is dielectric material 4. The dielectric material 4 is located in the slot and preferably fills the slot between the metallic electrodes 2, 3 such that it is in direct contact with both of the electrodes 2, 3. The slot has a width (w) and a length (l). The whole slot waveguide 6 has a thickness (t). Width is the distance between the two metallic electrodes, length is the distance from the input of the slot waveguide 6 (the first end of the slot) to the output of the slot waveguide 6 (the second end of the slot) and the thickness is the thickness of the dielectric material 4 in the slot. In the embodiment of the FIGS. 1A and 1B, the thickness of the waveguide corresponds to the thickness of the electrodes 2, 3 and the distance from the surface of the substrate 5 to the top of the slot waveguide 6.

The width of the slot is 20-1000 nm, for example 50-500 nm, such as 100-300 nm. The length of the slot is 1-100 μm, for example 5-50 μm, such as 10-20 μm. The thickness of the slot is 10-500 nm, for example 20-300 nm, such as 50-150 nm. The thickness of the slot corresponds to the thickness of the slot waveguide 6 in embodiments shown in the FIGS. 1A and 1B.

Figure 2:
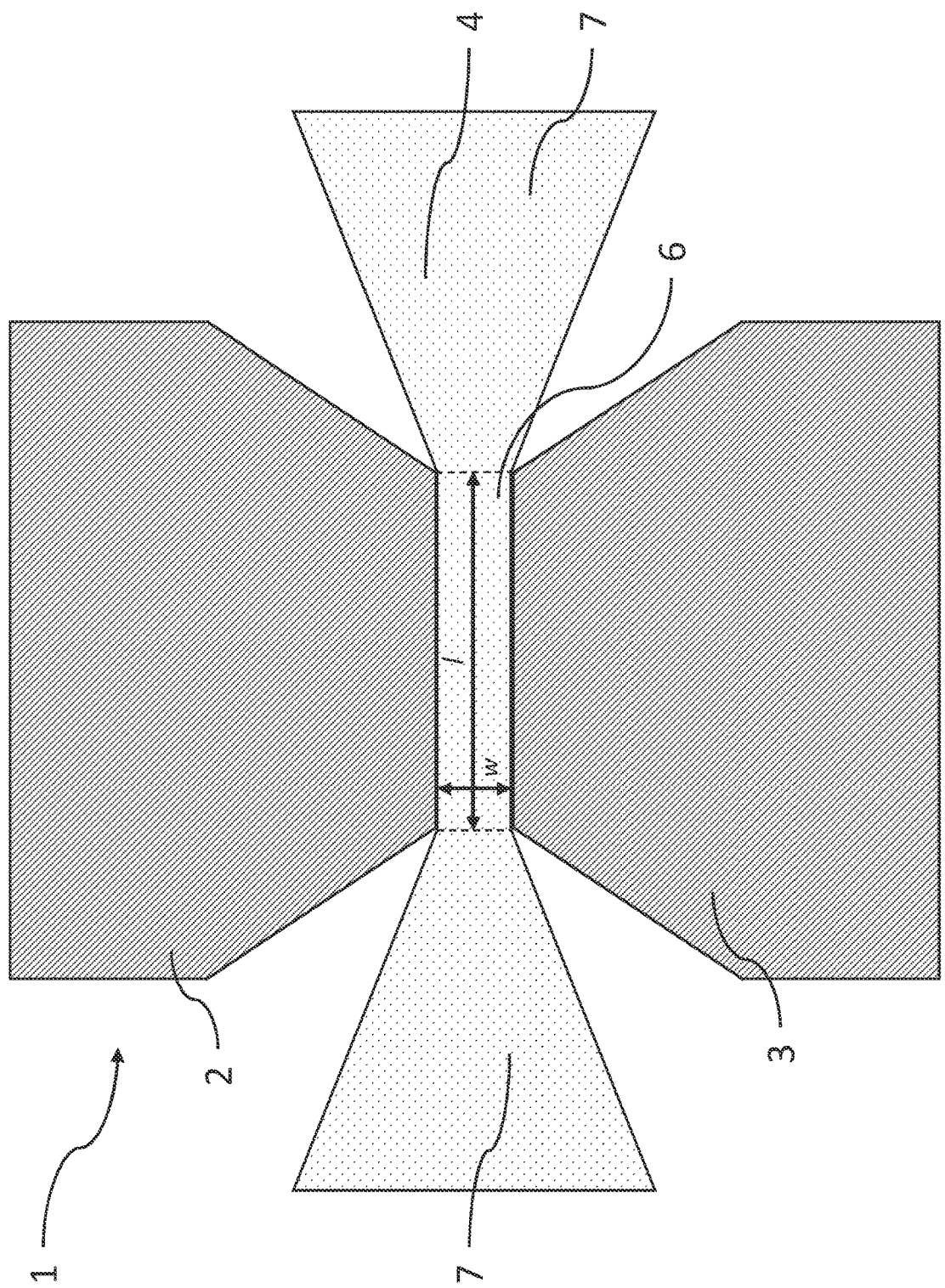
FIG. 2 illustrates a top view of an electro-optic device in accordance with at least some embodiments of the present invention.

According to the embodiment of FIG. 2 the slot waveguide 6 is extended by two dielectric waveguides 7 on both ends of the slot waveguide 6. The dielectric waveguide 7 and the metallic electrodes 2, 3 are tapered. This enables the light signal to pass from a wider input to the narrow slot waveguide 6.

Figure 3:
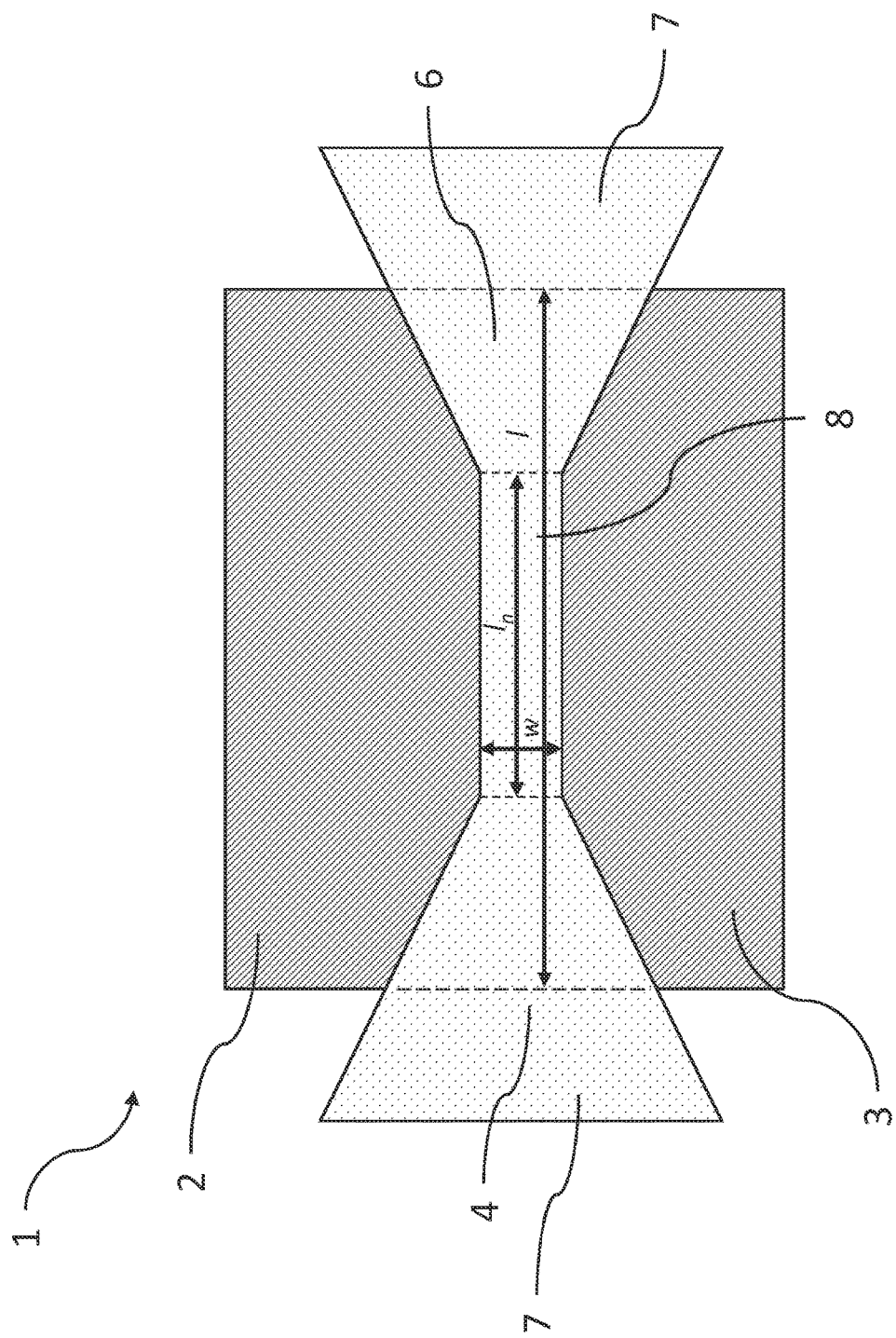
FIG. 3 illustrates a top view of an electro-optic device in accordance with at least some embodiments of the present invention.

According to the embodiment of FIG. 3 the slot waveguide 6 is extended by dielectric waveguides 7. In this embodiment the slot waveguide 6 is tapered from both ends. This enables the light signal to pass from a wider input to the narrow portion 8 of the slot waveguide 6. The length t in this embodiment is the length of the slot. The length $l_n$ is the length of the narrow portion 8 of the slot waveguide 6. In this embodiment, and other embodiments where the slot waveguide 6 is tapered, the width w refers to the width of the narrow portion 8 of the slot waveguide 6.

According to the embodiment of FIGS. 4A, 4B and 4C the thickness t of the slot waveguide 6, which is the plasmonic section of the device 1, is too thin to have a good matching mode in the input section. To improve coupling, a thicker input waveguide 9 can be used and then narrowed down when coupling to the slot waveguide 6. The thicker input waveguide 9 can be made of the same dielectric as the dielectric material 4, or the material of the thicker input waveguide 9 can also be a different dielectric. The material is selected so that the refractive index is high enough that the light signal is attracted to it. If the refractive index is not high enough the light signal is not in the thicker waveguide 9, but instead stays only in the dielectric material 4 on which the thicker waveguide 9 is placed. The material of the thicker waveguide 9 can be for example a-Si, silicon nitride or silicon dioxide.

The output waveguide 9 is similar to the input waveguide 9. The width of both these waveguides is narrowed towards the slot waveguide 6 as explained above. In this embodiment also the metallic electrodes 2, 3 are tapered. As the thicker waveguide 9 gets narrower as it gets closer to the slot waveguide 6, the light signal moves from the thicker waveguide 9 to the dielectric material 6. The opposite effect happens on the output side of the waveguide. As the narrow part of the thicker output waveguide 9 grows wider, it attracts the light signal from the dielectric material 4 to the thicker waveguide 9.

The device according to this embodiment comprises a hybrid waveguide 10 which has a similar dielectric waveguide 7 as the embodiment of FIG. 3, but on top of this it has a tapered thicker waveguide 9. Only the width of the thicker waveguide 9 layer of the hybrid waveguide 10 is tapered down, whereas its thickness remains unchanged. The width of the end surface of the tapered thicker waveguide 9 is for example at least 10% of the width of the thicker waveguide 9 and it is not wider than the width w of the narrow portion 8 of the slot waveguide 6. The length 1 in this embodiment is the length of the slot. The length $l_n$ is the length of the narrow portion 8 of the slot waveguide 6. In this embodiment, and other embodiments where the slot waveguide 6 is tapered, the width w refers to the width of the narrow portion 8 of the slot waveguide 6.

According to an embodiment, the embodiment of FIG. 2 can also be modified similarly as FIG. 3 is modified above to reach the embodiment on FIG. 4A. In such an embodiment, the dielectric waveguide 7 of FIG. 2 has a tapered thicker waveguide 9 on top of it. Only the width of the thicker waveguide 9 layer of the hybrid waveguide 10 is tapered down, whereas its thickness remains unchanged. The width of the end surface is for example at least 10% of the width of the thicker waveguide and it is not wider than the width w of the slot waveguide 6.

According to an embodiment, the electro-optic plasmonic device 1 is manufactured so that the metallic electrodes 2, 3 are first provided on a substrate 5. The electrodes have a slot between them in which a dielectric material 4 is provided into. These steps are preferably performed in an inert atmosphere to prevent the oxidation of the metallic electrodes 2, 3 so that the interface between the metallic electrodes 2, 3 and the dielectric material 4 is clear of any unwanted metal oxides. Alternatively, electrodes or at least their surfaces defining the slot are made of a metal that does not form a native oxide.

According to another embodiment, the electro-optic plasmonic device 1 is manufactured so that the dielectric material 4 is first provided on a substrate 5. The metallic electrodes 2, 3 are then provided onto the substrate 5 on each side of the dielectric material 4 so that the metallic electrodes 2, 3 form a slot in which the dielectric material is in.

According to one embodiment an electro-optic plasmonic device 1 comprises: a slot waveguide 6 defined by a first metallic electrode 2, a second metallic electrode 3 and dielectric material 4 in a slot between the first and second metallic electrodes 2, 3, wherein the device 1 is configured to utilize the electric field induced Pockels effect.

According to an embodiment the dielectric material 4 contains at least one dielectric material, which exhibits an effective Pockels effect of at least 40 pm/V, such as at least 100 pm/V, preferably of at least 200 pm/V, at an input wavelength, when a bias DC voltage (direct current voltage) is applied between the first and second metallic electrodes 2, 3. In an embodiment, also an electrical signal voltage is applied between the same first and second metallic electrodes 2, 3.

According to an embodiment the input wavelength is between 400 nm and 10000 nm, such as 400-3000 nm. In preferred embodiments, the input wavelength is between 800 nm and 2400 nm, such as 1200-1800 nm. One particular embodiment is phase modulation of an input signal at 1550 nm or 1310 nm wavelength in telecommunications applications.

According to an embodiment the DC voltage is selected such as to create an electric field across the dielectric material 4 with the field strength of at least 1 V/μm, such as at least 30 V/μm, or at least 500 V/μm. Preferably, the electric field strength is designed to be close to the breakdown field of the dielectric material 4, such as at least 75% of the breakdown field, for example 80-99% or 90-95% of the breakdown field. Thus, the magnitude of the DC voltage applied depends on the width w of the slot and the breakdown field of the dielectric material 4.

According to an embodiment the electro-optic plasmonic device 1 is configured to operate with the DC voltage of 0.1-500 V, such as 10-100 V.

According to an embodiment the dielectric material 4 is at least one of silicon, silicon nitride, silicon dioxide, tellurium dioxide, polytetrafluoroethylene, diamond and germanium. Preferably the dielectric material 4 is amorphous silicon.

According to an embodiment the first and second metallic electrodes 2, 3 are made of a metal that does not form native oxide, for example gold. Also other metals can be used, such as aluminium, copper or nickel. In case of a metal that forms a native oxide, it is preferable to prevent formation of the native oxide on the surfaces defining the slot, for example by keeping the surfaces in an inert atmosphere before application of the dielectric material 4 or applying a thin layer of another metal, such as gold, on the surfaces. The native oxide can also be prevented in case the dielectric material 4 is applied first and the metallic electrodes are manufactured directly on the surface of the dielectric material 4.

According to an embodiment the width of the slot between the metallic electrodes 2, 3 is 20-1000 nm, for example 50-500 nm, such as 100-300 nm.

According to an embodiment the length of the slot between the metallic electrodes 2, 3 is 1-100 μm, for example 5-50 μm, such as 10-20 μm.

As is apparent from the above discussion, the device utilizes Pockels effect through an electric-field-induced effective second-order nonlinear susceptibility $\chi_{eff}^{(2)}$.

In the devices according to embodiments, the electric-field-induced effective second-order nonlinear susceptibility is utilized to modulate a light signal propagating in the slot waveguide 6 with an electrical signal by means of the Pockels effect occurring in the dielectric material 4 in the slot waveguide 6.

According to an embodiment, the device comprises means for applying an electric field across the dielectric material 4 in the slot in order to induce the effective second-order nonlinear susceptibility in the dielectric material 4. According to an embodiment, the means for applying the electric field comprises a DC voltage source and the first and second metallic electrodes 2, 3.

According to an embodiment, the modulating electrical signal is applied across the dielectric material (4) in the slot. According to an embodiment, the amplitude of the modulating electrical signal is less than 10 V, such as 0.5-3 V or 0.5-2 V. In an embodiment, phase modulation is performed by means of a fast RF (radio frequency) signal having an amplitude of 0.5-2 V, such as about 1 V. In the present document, the amplitude refers to the peak-to-peak amplitude of the signal.

According to one embodiment, the radio frequency is up to 1 THz, for example 1 kHz to 500 GHz, such as 10 GHz to 100 GHz.

According to an embodiment, both the modulating electrical signal and the DC voltage are applied through the first and second metallic electrodes 1, 3. In an alternative embodiment, separate electrodes are provided for the modulating electrical signal to apply a corresponding varying electric field across the dielectric material (4) in the slot.

According to an embodiment the device is a phase modulator. The device can also be used as a phase modulator in the arm of a Mach-Zehnder interferometer to achieve amplitude modulation or as a phase modulator to achieve amplitude modulation in a microring resonator, for instance.

According to an embodiment the method of manufacturing an electro-optic plasmonic device 1 comprising: providing dielectric material 4, a first metallic electrode 2 and a second metallic electrode 3 on a substrate 5 such that the first metallic electrode 2 and the second metallic electrode 3 define a slot waveguide 6 in a slot between the them; and the dielectric material 4 is provided in the slot, wherein the dielectric material 4 exhibits electric field induced Pockels effect.

The substrate can be for example a layer of Si or $SiO_2$. According to one embodiment the metal electrodes 2, 3 can be manufactured for example by depositing a layer of metal and using photolithographic techniques to form the patterns, either before or after the deposition. Dielectric material 4 can then be applied in the slot between the electrodes 2, 3.

According to another embodiment, the dielectric material 4 is deposited first on a substrate. Then the dielectric material 4 is etched. Finally, a first and second electrode 2, 3 are deposited on the substrate on both sides of the dielectric material 4.

According to an embodiment the method steps are performed in an inert atmosphere.

According to an embodiment there is provided a method for performing phase modulation by means of the device described above. The method comprises the steps of applying a DC voltage between the first and second metallic electrodes (2, 3), applying a modulating electrical signal across the dielectric material (4) and guiding an optical signal through the dielectric material (4) wherein the phase of the optical signal is modulated by the modulating electrical signal.

With the embodiments, it is possible to achieve an ultra-fast, compact and linear modulator, using silicon process compatible materials and without exotic materials. In embodiments, it is also possible to avoid using polymers, which are well known to have reliability issues.

At least some embodiments enable ultra-fast modulators with small footprint based on silicon, which are also broadband, linear and provide low power consumption. This is very important in applications including energy efficient telecom and datacom (especially for data centres), and microwave photonics (e.g. for 5G and beyond), where having linear modulation is crucial. A very important field of application is Quantum Technologies, for example, in electro-optical interfaces for quantum computers, where low-power consumption and fast modulators are needed to work at cryogenic temperatures.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present electro-optic plasmonic device has a broad range of uses. In particular, it can be used in ultra-fast plasmonic modulators.

REFERENCE SIGNS LIST

1 Electro-optic plasmonic device
2 First metallic electrode
3 Second metallic electrode
4 Dielectric material
5 Substrate
6 Slot waveguide
7 Dielectric waveguide
8 Narrow portion of the slot waveguide
9 Thicker waveguide
10 Hybrid waveguide

CITATION LIST

Non Patent Literature

Maurizio Burla, et al., "500 GHz plasmonic Mach-Zehnder modulator enabling sub-THz microwave photonics", APL Photonics 4, 056106 (2019)
Narayanan, Karthik et al., "Optical nonlinearities in hydrogenated-amorphous silicon waveguides", Optics Express September 2010
Pelc, Jason S., et al., "Picosecond all-optical switching in hydrogenated amorphous silicon microring resonators", Optics Express April 2014
Rao, Sandro, et al., "A 2.5 ns switching time MachZender modulator in as deposited a-Si:H", Optics Express September 2012
Reed, G. T., et al., "Silicon optical modulators", Nature Photonics April 2010
Timurdogan, E., et al., "Electric field-induced second-order nonlinear optical effects in silicon waveguides", Nature Photonics February 2017
Zhang, J. et al. article "Electrically controlled second-harmonic generation in silicon-compatible plasmonic slot waveguides: a new modulation scheme", Optics Letters June 2014

The invention claimed is:

1. An electro-optic plasmonic device comprising:
a slot waveguide defined by a first metallic electrode, a second metallic electrode and dielectric material in a slot between the first and second metallic electrodes, wherein the device is configured to utilize an electric-field-induced Pockels effect for modulating the phase of a light signal propagating in the slot waveguide with an electrical signal, and wherein the dielectric material is amorphous silicon.

2. The device of claim 1, wherein the dielectric material contains at least one dielectric material, which exhibits a third-order nonlinear susceptibility of at least $10^{-22}$ m$^2$/V$^2$, such as at least $10^{-21}$ m$^2$/V$^2$, preferably at least $10^{-20}$ m$^2$/V$^2$.

3. The device of claim 1, wherein the dielectric material contains at least one dielectric material, which exhibits an effective Pockels effect of at least 40 pm/V at an input wavelength, when a DC voltage is applied between the first and second metallic electrodes.

4. The device of claim 3, wherein the input wavelength is between 1200 nm and 1800 nm.

5. The device of claim 4, wherein the DC voltage is selected such as to create an electric field across the dielectric material with the field strength of at least 75% of the breakdown field of the dielectric material.

6. The device of claim 3, configured to operate with the DC voltage of 0.1-500 V.

7. The device of claim 1, wherein the first and second metallic electrodes are made of gold.

8. The device of claim 1, wherein the width of the slot is 20-1000 nm.

9. The device of claim 8, wherein the length of the slot is 1-100 μm.

10. The device of claim 8, wherein the thickness of the slot is 10-500 nm.

11. The device of claim 1, wherein the slot has a narrow portion and at least one wider portion, such that the width of the narrow portion of the slot is 20-500 nm.

12. The device of claim 1, configured to apply a modulating electrical signal across the dielectric material.

13. The device of claim 12, wherein the amplitude of the modulating electrical signal is less than 10 V.

14. The device of claim 13, wherein the device is adapted to perform phase modulation by means of a radio frequency signal having a radio frequency between 1 kHz and 1 THz.

15. An electro-optic plasmonic device comprising:
a slot waveguide defined by a first metallic electrode, a second metallic electrode and dielectric material in a slot between the first and second metallic electrodes,
wherein the dielectric material is amorphous silicon, and
wherein the device is configured to utilize an electric-field-induced Pockels effect for modulating the phase of a light signal propagating in the slot waveguide with an electrical signal.

16. The device of claim 15, wherein the dielectric material exhibits an effective Pockels effect of at least 100 pm/V at an input wavelength between 1200 nm and 1800 nm, when a DC voltage is applied between the first and second metallic electrodes.

17. An electro-optic plasmonic phase modulator comprising
a slot waveguide defined by a first metallic electrode, a second metallic electrode and dielectric material in a slot between the first and second metallic electrodes,
wherein the dielectric material is amorphous silicon, and
wherein the device is configured to utilize an electric-field-induced Pockels effect for modulating the phase of a light signal propagating in the slot waveguide with an electrical signal.

18. The device of claim 17, configured to apply a modulating electrical signal across the dielectric material such that the amplitude of the modulating electrical signal is less than 10 V.

* * * * *